United States Patent
Wang et al.

(10) Patent No.: US 7,606,928 B2
(45) Date of Patent: Oct. 20, 2009

(54) METHOD AND DEVICE FOR CONTROLLING RECEIVER BUFFER FULLNESS LEVEL IN MULTIMEDIA STREAMING

(75) Inventors: Ru-Shang Wang, Coppell, TX (US); Viktor Varsa, Irving, TX (US); David Leon, Irving, TX (US); Emre Baris Aksu, Tampere (FI); Igor Danilo Diego Curcio, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/395,015

(22) Filed: Mar. 21, 2003

(65) Prior Publication Data

US 2004/0186877 A1    Sep. 23, 2004

(51) Int. Cl.
G06F 15/16 (2006.01)
G06F 13/00 (2006.01)

(52) U.S. Cl. ............... 709/233; 719/313; 709/231; 709/232; 709/234

(58) Field of Classification Search ............ 719/313, 719/314; 709/231–234
See application file for complete search history.

(56) References Cited

U.S. PATENT DOCUMENTS 5,768,527 A    6/1998    Zhu et al. ............ 395/200.61

6,292,834 B1 *  9/2001    Ravi et al. ............ 709/233

(Continued)

FOREIGN PATENT DOCUMENTS

EP    1 054 544 A2    11/2000

(Continued)

OTHER PUBLICATIONS

"Timebase Interlock in RTP Conferences"; C. Harrison; IETF draft-harrison-avt-interlock-01, proposed draft; Mar. 2001; pp. 1-20.

(Continued)

*Primary Examiner*—Li B Zhen
(74) *Attorney, Agent, or Firm*—Ware, Fressola, Van Der Sluys & Adolphson, LLP (57) ABSTRACT

A method to provide to a sender of RTP packets the actual receiver buffer fullness level in a receiver of the RTP packets at a certain time instant represented as remaining playout duration in time. The receiver sends in an RTCP report the sequence number of a selected RTP packet in the receiver buffer and the time difference between the scheduled playout time of this packet and the current time. Based on this timing information, the sender calculates the amount of time it would take for the receiver buffer to empty if the receiver continues to playout at normal speed and no further RTP packets arrive to the receiver buffer. This receiver buffer fullness level information can be used at the sender to adjust the transmission rate and/or nominal playout rate of the RTP packets in order to maintain a targeted receiver buffer fullness level.

26 Claims, 3 Drawing Sheets

U.S. PATENT DOCUMENTS

| | | | | |
|---|---|---|---|---|
| 6,438,630 | B1 * | 8/2002 | DeMoney | 710/56 |
| 6,701,372 | B2 * | 3/2004 | Yano et al. | 709/232 |
| 6,988,144 | B1 * | 1/2006 | Luken et al. | 709/231 |
| 7,016,970 | B2 * | 3/2006 | Harumoto et al. | 709/233 |
| 7,047,308 | B2 * | 5/2006 | Deshpande | 709/232 |
| 2003/0033425 | A1 * | 2/2003 | Deshpande | 709/233 |
| 2003/0037158 | A1 | 2/2003 | Yano et al. | |
| 2003/0061371 | A1 * | 3/2003 | Deshpande | 709/232 |
| 2003/0103460 | A1 * | 6/2003 | Kamath et al. | 370/236.2 |
| 2004/0066775 | A1 * | 4/2004 | Grovenburg | 370/350 |
| 2005/0021830 | A1 * | 1/2005 | Urzaiz et al. | 709/234 |

FOREIGN PATENT DOCUMENTS

EP        1054544 A2 *  11/2000

OTHER PUBLICATIONS

"Transparent end-to-end packet switched streaming service (PSS); Protocols and codecs (Release 5)"; 3GPP TS 26.234, V5.0.0 (Mar. 2002); pp. 1-80.

3GPP TSG-SA4#25bis meeting, Feb. 24-28, 2003, Berlin, Germany, Tdoc S4 (03)0126, Nokia, New client to server signaling for co-operative rate adaptation.

Network Information Based Rate Controls on Multimedia Streaming Servers, Yuko Onoe, et al, Mar. 15, 2003, IPSJ SIG Notes, Information Processing Society of Japan, vol. 44, No. 3, p. 625-636.

* cited by examiner

METHOD AND DEVICE FOR CONTROLLING RECEIVER BUFFER FULLNESS LEVEL IN MULTIMEDIA STREAMING

FIELD OF THE INVENTION

The present invention relates generally to multimedia streaming and, more particularly, to receiver buffer fullness management of the multimedia streaming client.

BACKGROUND OF THE INVENTION

In a multimedia streaming service, there are three participants involved in the streaming service, a streaming server, a streaming client and a transmission medium. The transmission medium is a path that consists of a chain of point-to-point line components, where the overall behavior is usually constrained by a bottleneck link in the path. In a mobile network, the bottleneck link is usually on the air interface, which is the last hop to the terminal in a downlink streaming scenario. The streaming server adjusts the transmission bitrate to the varying available bandwidth on the bottleneck link. While doing so, the streaming server also controls the streaming client's receiver buffer fullness level so as to avoid buffer underflow (i.e. playout interruption) or overflow (i.e. packet drops) at the client. In 3GPP TS 26.234 V5.0.0 (2002-03) "Transparent end-to-end packet switched streaming service (PSS); Protocols and codecs" (Release 5), the streaming client at the beginning of the streaming session buffers a negotiated pre-determined amount of data before the actual playout starts (initial receiver buffering delay). Knowing the initial receiver buffering delay the server thereafter estimates the receiver buffer fullness level by assuming that the client follows exactly the sampling timestamps of the media for playout. The server does not know whether the client behaves as assumed. For example, it is possible that the client's clock may drift relative to the server's clock. Also, the client's playout rate may be slowed down or the client may perform extra buffering.

System clock drift—the accepted standard of accuracy in modern electronic systems is ±1 minute per month at 25° C. and ±40 minutes per year at 60° C. Uncompensated timing crystals can cause system clocks to gain or lose as much as 100 minutes per year in operation over the industrial temperature range. If we assume the accuracy of the server's clock and the client's clock is ±40 minutes per year and the server and the client's clocks are drifting in opposite directions, the relative drift is 0.5479 seconds per hour. If the accuracy is ±100 minutes per year and the server and the client's clocks are drifting in opposite directions, the relative drift is 1.3699 seconds per hour.

Client system slow down—if many applications are running at the same time, the client operation system could be slowed down, causing slower playout.

Extra buffering—it is possible that the client initially buffers a larger amount than the negotiated value without the acknowledgment of the server. This results in extra buffering. Also, the client may perform rebuffering (i.e. further delaying the playout) if the receiver buffer underflows due to exceptionally long packet delays (e.g. at a time of a mobile handover).

In the above-mentioned situations, the server's assumptions about the receiver buffer fullness level will be incorrect because the client does not play out at exactly the rate as the server assumes. Thus, when the server executes the rate adaptation operations relying on the assumed receiver buffer fullness level, underflow or overflow in the receiver buffer may occur.

In prior art PSS streaming system, there are no mechanisms to prevent the incorrect assumptions from happening and to eliminate the difference between the actual fullness level and the server assumed fullness level in the receiver buffer. Whenever a receiver buffer underflow or overflow happens due to incorrect assumptions, the streaming client has to handle such receiver buffer violation on its own (i.e. performing rebuffering or dropping packets). Alternatively, in a receiver buffer violation situations the client can request the streaming server to re-initialize the streaming session by sending a new RTSP (Real-time Streaming Protocol) PLAY request, re-initializing the streaming session and thereby re-establishing the server's correct assumptions about the receiver buffer fullness level.

Similar problem arises in prior-art remote live camera feed applications, where live video signals (e.g. special news and sport events) are streamed from multiple cameras (video sources) to a central television studio over an IP (Internet Protocol) connection. The live feed is forwarded from the central studio to one or more broadcast station for broadcast. When two or more video sources are combined for streaming, the streaming system must ensure that time synchronization is maintained among all the sources and the central studio. To that end, the central studio maintains a master sync generator or master clock ("house sync"), running for example at the U.S. standard frequency of 29.97 frames per second, to which the entire studio plant is synchronized. If the cameras are operating in a "free running" mode, their time base will drift relative to the studio's house sync and video frames will have to be dropped or duplicated during the broadcast in the effort to maintain real-timeness of the playout. According to IETF draft-harrision-avt-interlock-01.txt, "Timebase Interlock in Real-time Transport Protocol (RTP) Conferences", C. Harrison, proposed draft, March 2001, it is possible to send via Real-time Control Protocol (RTCP) extension a "Timebase Management (TBM) buffer status message" from the central studio to the remote cameras to report the "amount of data remaining in buffer in kbytes" in the studio receiver buffer. As such, based on this buffer status message each of the cameras detects whether its clock drifts and adjusts its clock in order to synchronize the clock to the house sync. Alternatively, the central studio can send "TBM speed control messages" to ask specifically each of the cameras to adjust its clock, based on the clock drift estimated by the studio.

SUMMARY OF THE INVENTION

It is a primary objective of the present invention to provide to a sender of RTP packets the actual receiver buffer fullness level in a receiver of the RTP packets at a certain time instant represented as the remaining playout duration in time. This objective can be achieved by providing the sender the sequence number of any RTP packet in the receiver buffer and the time difference between the scheduled playout time of this packet and the current time. Or alternatively, the same objective can be achieved, though with less precision, by providing the sender the sequence number of the last received RTP packet and the sequence number of the next to be played out RTP packet at the receiver.

The receiver buffer information observed by the sender is in time domain, and reflects the actual remaining playout duration in the receiver buffer (i.e. the amount of time it would take for the receiver buffer to deplete if no new RTP packets are added to the buffer). When compared with prior-art where the sender only estimates the receiver buffer fullness level or the sender only knows the receiver buffer fullness level represented as number of bytes in the receiver buffer, the invention provides means for the sender to accurately detect playout rate deviations (e.g. clock drift).

It is a further objective of the present invention to provide to a sender of RTP packets in addition to the actual receiver buffer fullness level in a receiver of the RTP packets also a targeted minimum receiver buffer fullness level that the receiver desires.

Accordingly, the first aspect of the present invention is a method for adaptively controlling fullness level of a receiver buffer in a streaming client in a multimedia streaming system, the streaming system comprising a streaming server capable of providing streaming data in packets at a transmission rate to the streaming client for allowing the client to playout at least a portion of the packets at a playout rate, wherein each packet has a sequence number, and wherein the receiver buffer is used to store at least a portion of the streaming data in order to compensate for a difference between the transmission rate and the playout rate so as to allow the client to have a sufficient amount of the streaming data to playout in a non-disruptive manner, and the stored portion of the streaming data in the receiver buffer includes a sequence of packets to be played out, said sequence including a first packet to be played out and a last packet to be played out. The method comprises the steps of:

providing to the server a message including information indicative of remaining playout duration in time in the receiver at a time instant; and adjusting in the server the transmission rate and/or nominal playout rate at which the streaming data is provided to the client.

The remaining playout duration in time is provided in form of an identity of a selected one of the sequence of packets to be played out and a time difference between a scheduled playout time of said selected packet and a current time.

The selected packet to be played out can be the first packet to be played out is the first packet in the sequence of packets to be played out, the last packet to be played out is the last packet in the sequence of packets to be played out, or any packet in between.

The identity of the selected packet is the sequence number of the selected packet or a timestamp associated therewith.

The method further comprises the step of computing in the server the fullness level in the receiver buffer based on the provided information and the sequence number or the timestamp of the last packet to be played out.

Preferably, the client also sends a receiver report (RTCP RR) along with said providing step, and wherein the receiver report includes information indicative of the last packet to be played out so as to allow the server to compute the fullness level in the receiver buffer based on the sequence number of the selected packet, the time difference between the scheduled playout time of the selected packet and the current time, and the sequence number of the last packet to be played out.

Advantageously, the message further includes information indicative of a targeted minimum buffer level so as to allow the server to adjust the transmission rate and/or nominal playout rate based on the targeted minimum buffer level.

The second aspect of the present invention is an adaptive control system for use in a multimedia streaming system, the streaming system comprising at least a streaming client and a streaming server capable of providing streaming data in packets at a transmission rate to the client for allowing the client to playout at least a portion of the packets at a playout rate, wherein each packet has a sequence number, and wherein the client including a receiver buffer for storing at least a portion of the streaming data in order to compensate for a difference between the transmission rate and the playout rate so as to allow the client to have a sufficient amount of the streaming data to playout in a non-disruptive manner, and the stored portion of the streaming data in the receiver buffer includes a sequence of packets to be played out, said sequence including a first packet to be played out and a last packet to be played out. The control system comprises:

in the client:
means for providing to the server a message including information indicative of remaining playout duration in time in the receiver at a time instant; and in the server:
means, responsive to the message, for computing a fullness level in the receiver buffer based on the provided information, for adjusting the transmission rate and/or nominal playout rate.

The third aspect of the present invention is a communication device in a multimedia streaming system, the streaming system comprising a streaming server capable of providing streaming data in packets to the communication device at a transmission rate for allowing the communication device to playout at least a portion of the packets at a playout rate, wherein each packet has a sequence number, and wherein the communication device has a receiver buffer to store at least a portion of the streaming data in order to compensate for a difference between the transmission rate and the playout rate so as to allow the communication device to have a sufficient amount of the streaming data to playout in a non-disruptive manner, and the stored portion of the streaming data in the receiver buffer includes a sequence of packets to be played out, said sequence including a first packet to be played out and a last packet to be played out. The communication device comprises:

means for computing remaining playout duration in time at a time instant based on the stored portion of the streaming data in the receiver buffer; and means for providing to the server a message including information indicative of the remaining playout duration in time at the time instant so as to allow the server to compute a fullness level in the receiver buffer based on the provided information.

Figure 2:
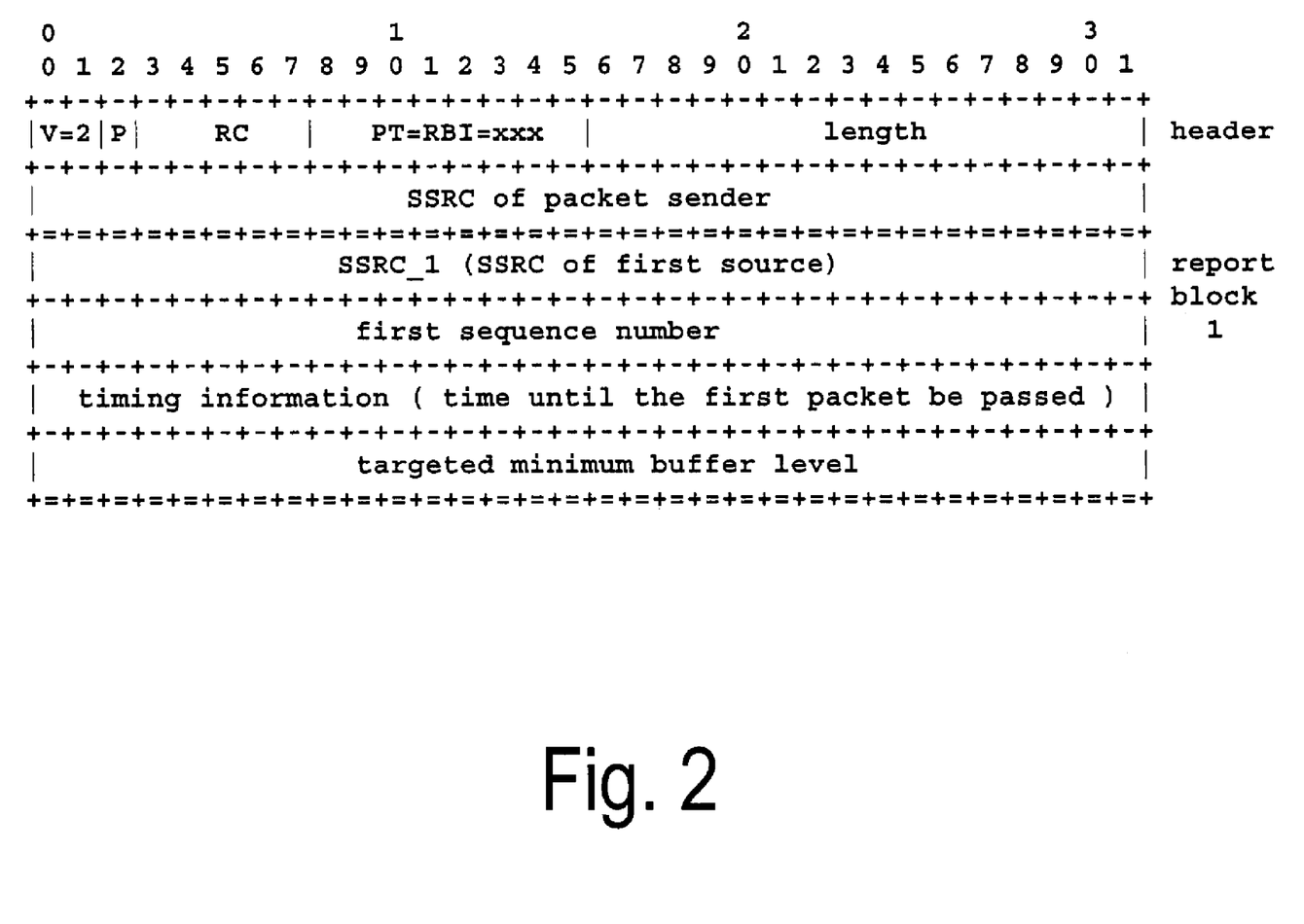
FIG. 2 shows a sample structure of proposed RTCP report packet, according to the present invention.
Figure 3:
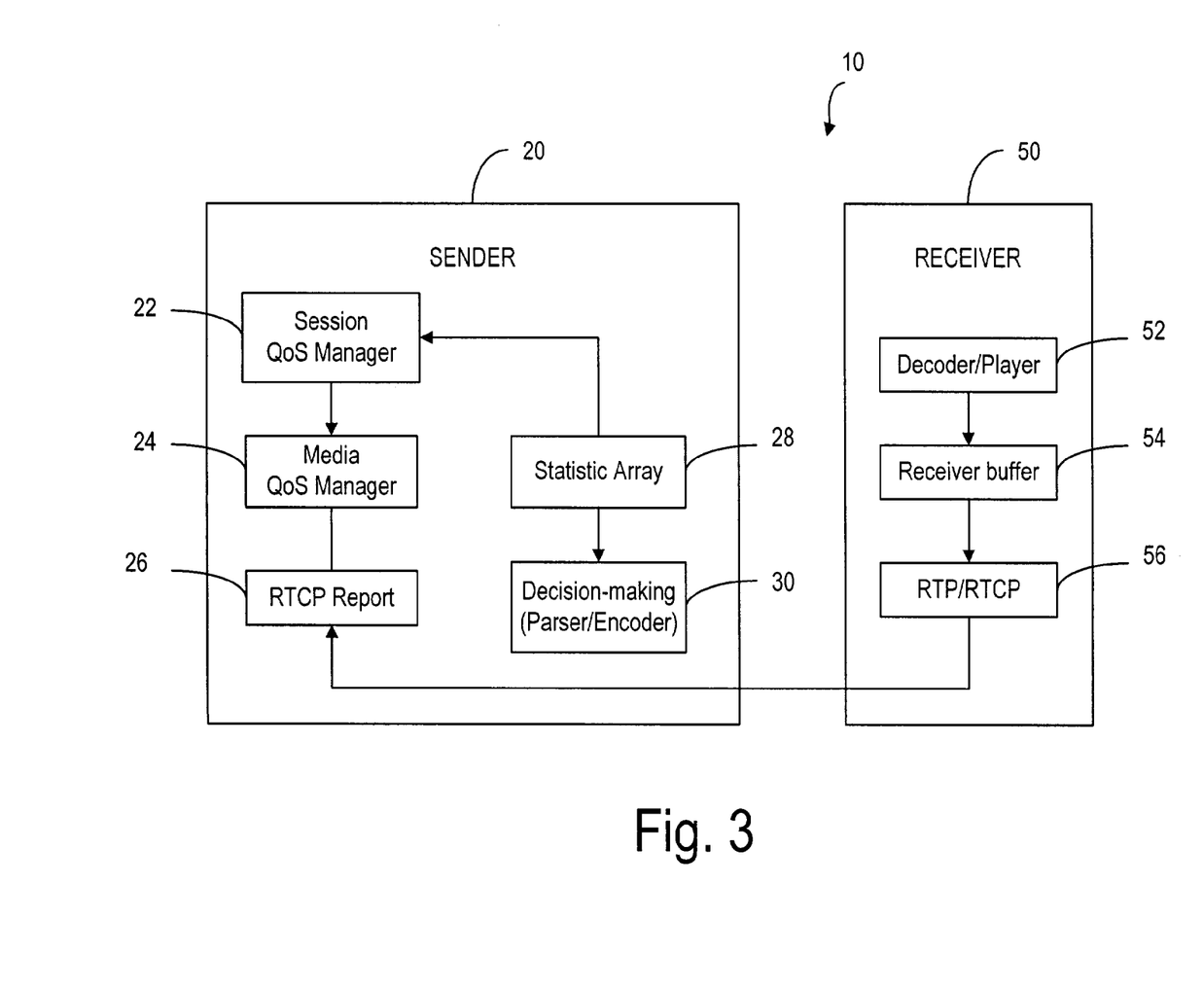
FIG. 3 is a block diagram illustrating the various components in the server and client for adaptively controlling the receiver buffer fullness level.

The present invention will become apparent upon reading the description taken in conjunction with FIGS. 2 and 3 and the related methods.

BEST MODE FOR CARRYING OUT THE INVENTION

Figure 1:
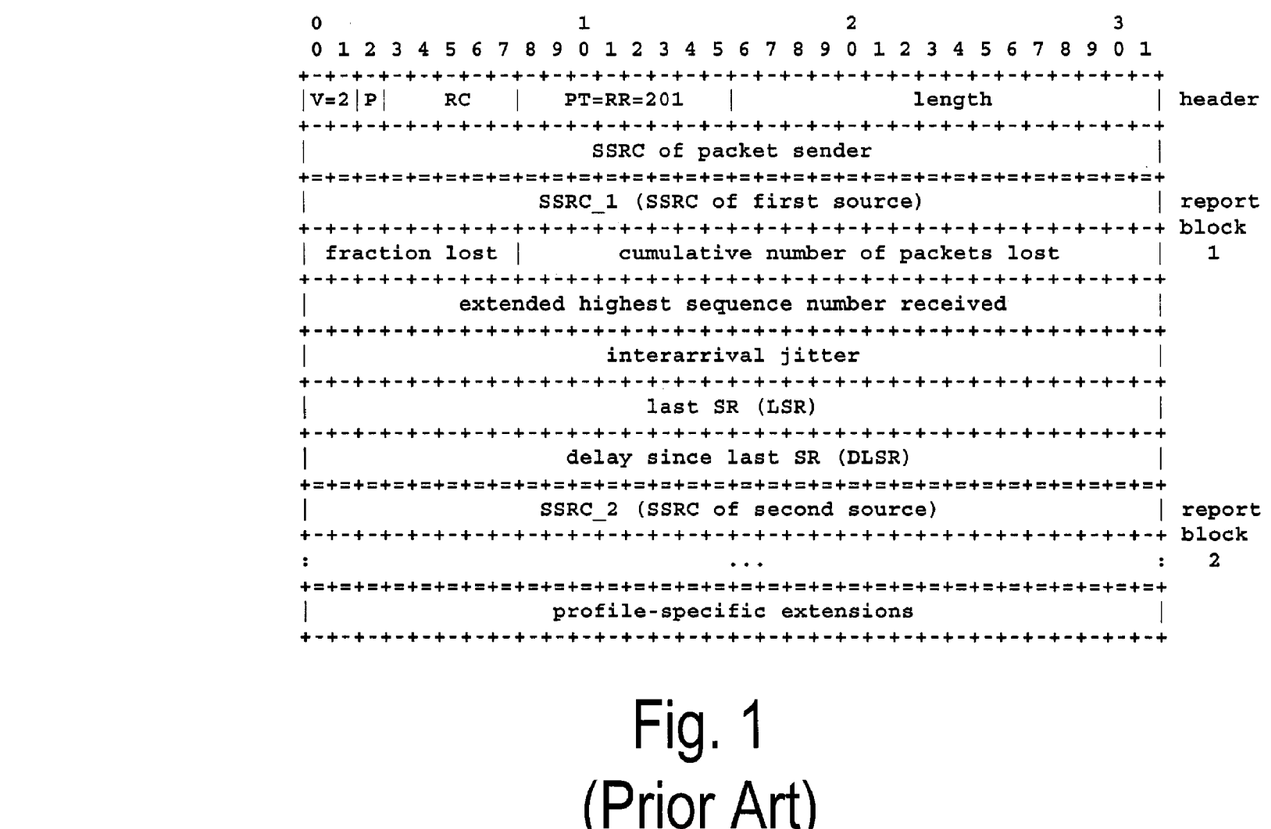
FIG. 1 shows the structure of a prior art RTCP RR packet.

The adaptive control of receiver buffer fullness level, according to the present invention, makes use of a new RTCP packet, which can be sent together with a prior art RTCP RR report packet as a compound packet. The prior art RTCP RR report is shown in FIG. 1 and the new RTCP packet is shown in FIG. 2. The packet type for the new RTCP packet can be referred to as RBI (Receiver Buffer Information) and would require a new packet type number, which is yet to be determined. The signaling between a receiver and a sender, according to the present invention, can be in a different structure format or be part of a profile-specific extension and other form of RTCP extension.

The adaptive control of receiver buffer fullness level, according to the present invention, is based on the difference between the packet transmission frequency at the sender of RTP packets and the RTP packet playout frequency at the receiver. At any time, it is assumed that the receiver buffer contains a plurality of RTP packets received from the sender. These RTP packets include a next RTP packet to be played out from the receiver buffer (first packet) and a last RTP packet to be played out from the receiver buffer (last packet). Each RTP packet has a sequence number and playout timestamp known to the sender, thus it is possible for the sender to know the playout time of any sequence number RTP packet relative to another sequence number RTP packet. Thus, if the sender has timing information indicative of the scheduled playout time of any RTP packet stored in the receiver buffer, the sender can calculate the scheduled playout time of any other RTP packet. The difference between the scheduled playout time of the last packet and the current time (i.e. the transmission time of the RTCP RR packet) of the receiver gives the current actual receiver buffer fullness level, represented as remaining playout duration in time. Let us denote:

$SN_x$ the sequence number of packet x in the receiver buffer;
$TS_x$ the RTP timestamp of packet x in the receiver buffer;

where x is in the range first $<= x <=$ last (between the first and last in the sequence of packets in the receiver buffer)

$F_{TS}$ the RTP timestamp resolution (i.e. ticks/s);
$T_x$ the time difference between the current time and the scheduled playout time of packet x.
$F_T$ the resolution of $T_x$ (i.e. ticks/s).

$T_{last}$ is equivalent to the current actual receiver buffer fullness level. The receiver can provide the necessary information to the sender to calculate $T_{last}$ in multiple forms. One such form of signaling is shown in FIG. 2, where a new RTCP packet type (PT=RBI) was defined to include $SN_{first}$ and $T_{first}$. Such RTCP packet can be included in a compound packet with a regular RTCP Receiver Report (RR) packet (as in FIG. 1). $SN_{last}$ is signaled in the "extended highest sequence number received" field in the RTCP RR packet.

The receiver of RTP packets can retrieve $SN_{first}$ and $TS_{first}$ (a part of the corresponding RTP packet) from its buffer and then estimates $T_{first}$ from $TS_{first}$ and the current position of the playout timer. With the RTP timestamp record, the sender can map $SN_{first}$ into $TS_{first}$ and $SN_{last}$ into $TS_{last}$ and calculate the receiver buffer fullness level ($T_{last}$) using the equation $$T_{last}=(T_{last}-TS_{first})*F_T/F_{TS}+T_{first}$$

Here $F_{TS}$ is known by the sender of the RTP packets. In practice, $F_T$ can be set equal to $F_{TS}$ and is also known by the sender. However, if $F_T$ is different from $F_{TS}$, the receiver of the RTP packets can provide $F_T$ to the sender.

Similar calculation is enabled if instead of $SN_{first}$ and $T_{first}$ the receiver signals $SN_x$ and $T_x$ (i.e. for any packet in the sequence of packets in the receiver buffer). In particular, it is also possible to signal $SN_{last}$ (already included in the regular RTCP RR report) and $T_{last}$ directly, avoiding the use of the above equation altogether. It is harder, however, for the receiver to estimate playout time of packets that are to be played out later in the future (e.g. the likelihood is higher that an unforeseen event disrupts playout before the estimated playout time), therefore in general the reliability of $T_{last}$ estimate is lower than that of $T_{first}$.

It should be noted that, although the preferred embodiment of the invention is to signal $SN_x$ and map it at the sender to $TS_x$, other embodiments could choose to signal $TS_x$ instead of $SN_x$ to the sender. The difference between these embodiments is that a media sample (e.g. a video image) can be mapped to multiple RTP packets (i.e. multiple RTP packets with different SN have the same RTP timestamp) and thus a TS does not have an one-to-one correspond to an SN.

In practice, the signaling delay (i.e. the time it takes the signaling message to arrive at the RTP packet sender from the time it was sent at the RTP receiver) is never equal to zero, the information received at the sender is always somewhat late (i.e. the playout timer of the receiver has progressed) and thus $T_{last}$ as calculated at the sender as the receiver buffer fullness level estimate always includes some error. This error has to be taken into account when $T_{last}$ is used in the sender.

In addition to the receiver buffer fullness level information, the client can also signal the sender a targeted minimum receiver buffer fullness level in time (e.g. $T_{min}$ as indicated in FIG. 2 of the example RTCP RBI packet) requesting the server to adapt the transmission rate and the nominal playout rate of the packets in a manner such that all received packets spend at least $T_{min}$ time before their playout in the receiver buffer.

Using the RTCP RBI packet that is sent together with a prior art RTCP RR report packet as a compound packet, the client is able to provide the server a message including information indicative of the remaining playout duration in time in the receiver buffer at a time instant so as to allow the server to adjust the transmission characteristic based on the provided information. For example, the server can change the transmission characteristic by bitstream switching, transmission rate decoupling where the transmission rate is different from the designated rate in order to increase or decrease the receiver buffer level. The server can also modify the playout rate of the bitstream so as to influence the receiver buffer fullness level. The sequence number of last packet ($SN_{last}$) in the receiver buffer can be found in the "extended highest sequence number received" field in the RTCP RR report. The remaining playout duration in time in the receiver buffer can be computed from a sequence number of a selected packet ($SN_x$) and timing information indicative of time until the selected packet passed to the decoder ($T_x$). $SN_x$ and $T_x$ can be included in two fields in the RTCP RBI packet. Here x can be first, last in the sequence of packets in the receiver buffer or any number in between. An RTCP RBI packet can be implemented to include a targeted minimum buffer level field where the receiver can use to request a desired minimum receiver buffer level from the sender. Furthermore, it is also possible to implement an RTCP RBI packet without the "timing information" field ($T_x$) and signal instead the first packet sequence number ($SN_{first}$) only. In that case, the server can estimate the receiver buffer fullness level based only $SN_{last}$ and $SN_{first}$. This approach is less accurate than when $T_{first}$ is also provided to the server. However, this information is helpful for the server in estimating the receiver buffer fullness level.

FIG. 3 is a block diagram showing various components in the server and in the client that are necessary to estimate accurately the receiver buffer fullness level. As shown in FIG. 3, a multimedia streaming system 10 comprises at least one sender 20 and one receiver 50 of the RTP packets. In the receiver 50 a decoder/player 52 will process the packets from the receiver buffer 54 and render them to the playback device(s) (not shown), while the RTP/RTCP 56 module is responsible for receiving RTP/RTCP packets and sending RTCP report packets 26 to the sender. The sender 20 receivers the RTCP report packets 26 from the receiver 50. A session QoS manager 22 in the sender 20 is responsible to manage overall session quality perceived the client, while a media QoS manager 24 is responsible for a single media type. Separate sets of RTCP reports 26 belong to each media type and are thus handled by separate media QoS managers 24. The statistic array 28 stores the statistic information (i.e. past RTCP reports) for each media type, which provides the information required for rate adaptation in the media QoS manager 24. The Decision-making block 30 takes processed information from the QoS manager 24 and then decides what type of adjustment in the transmission characteristic is required to fulfill the adaptation, for example. The sender 20 (streaming server, remote camera) uses the information provided from the receiver 50 (streaming client, studio) to adjust the transmission rate and/or nominal playout rate of the different media to maintain the receiver buffer fullness level and/or perform "clock drift correction". The different media QoS managers 22 can provide different rate adaptations for the different media types. The proposed signaling is not restricted to audio or video media type, but it can be used for any other media.

Exemplary Applications $T_{last}$ can be used to solve the problems in the following application scenarios:

A. Multimedia Streaming

The streaming server can correct its assumptions about the receiver buffer fullness level using $T_{last}$. Using the actual receiver buffer fullness level information, instead of the assumed one, avoids receiver buffer violation that would occur due to incorrect receiver buffer fullness level assumptions.

In addition to the above defined RTCP packet type (PT=RBI), in multimedia streaming applications, the necessary information to compute $T_{last}$ can also be conveyed in an RTCP application specific feedback packet or any other non RTCP means such as RTSP (Real-time Streaming Protocol) or other external means.

The targeted minimum receiver buffer fullness level $T_{min}$ is useful in multimedia streaming applications. For example in case the receiver wants to maintain a minimum receiver buffer fullness level to be able to withstand temporary packet transfer rate drops that are out of the control of the sender (e.g. a network link interruption due to mobile station handover) without depleting completely the receiver buffer (i.e. buffer underflow that would cause playout interruption).

B. Remote Live Camera Feed

Using regular $T_{last}$ updates (i.e. at every RTCP report) after a sufficiently long period of time (because the clock drift, in general, is slow, it is most likely to take 5 to 10 minutes to see the clock drift effect), the remote camera can estimate its clock drift and synchronize its clock to the studio's system clock.

The sender keeps a record of the estimated buffer fullness level, which is denoted as $ST_{last}$, while transmitting packets. The deviation of the buffer fullness level between the estimated buffer fullness level and the computed $T_{last}$ as a function of time can be expressed as $$D(t)=(ST_{last}(t)-T_{last}(t)).$$

However D(t) is generally influenced by the signaling delay, which in itself is a variable, and the deviation, in general, has a positive offset at first due to the fact that there are packets still in transit. If the receiver's clock is slower compared with the sender then D(t) becomes negative as the receiver buffer fullness level is higher than expected. To estimate the clock drift, the first step would be to process the deviation D(t) by means such as line-fitting, median filtering and other estimation schemes such as Least Median of Squares to produce a line function $\tilde{D}(t)$. The second step would take the derivative of $$\tilde{D}(t)\left(\frac{d\tilde{D}(t)}{dt}\right),$$

which will give the actual clock drift and thus provide the sender the correction factor. In practice, the estimation should be made for a longer period of time say at least a few minutes depends on the amount of drift.

Although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method for adaptively controlling fullness level of a receiver buffer in a streaming client, the streaming client adapted to receive a sequence of packets from a streaming server through a communication link, said method comprising:

selecting in the streaming client one of the packets in the sequence to be played out, the selected one packet having a scheduled playout time, wherein the receiver buffer is adapted for storing at least part of the sequence of packets;

conveying through the communication link a message from the streaming client to the streaming server including information indicative of the scheduled playout time of the selected packet in the sequence to be played out; and determining in the server the fullness level of the receiver buffer at least partly based on the information for adjusting transmission characteristic in the streaming server, wherein the fullness level is computed based on a sequence number of the selected packet, a time difference between the scheduled playout time of the selected packet and a current time, and the sequence number of a last packet in the sequence to be played out.

2. The method of claim 1, wherein the information is provided in form of an identity of the selected one packet in the sequence to be played out and the current time.

3. The method of claim 1, wherein said selected packet in the sequence to be played out is a first packet in the sequence.

4. The method of claim 1, wherein said selected packet in the sequence to be played out is the last packet in the sequence.

5. The method of claim 2, wherein the identity of the selected packet is the sequence number.

6. The method of claim 2, wherein each of the packets in the sequence has a time stamp associated therewith and wherein the identity of the selected packet is the timestamp associated with the selected packet.

7. The method of claim 4, wherein the server is adapted to determine the fullness level of the receiver buffer at least partly based on a sequence number of the packet last received by the streaming client and a sequence number of a first packet in the sequence to be played out.

8. The method of claim 1, further comprising
computing in the server the fullness level in the receiver buffer based on a timestamp associated with the last packet in the sequence to be played out and the provided information.

9. The method of claim 1, wherein the client is adapted to send a receiver report along with the conveying of the message to the streaming server, and wherein the receiver report includes information indicative of the last packet in the sequence to be played out.

10. The method of claim 1, wherein the client is adapted to send a receiver report along with the conveying of the message to the streaming server, and wherein the receiver report includes information indicative of the last packet to be played out.

11. The method of claim 1, wherein said message further includes information indicative of a targeted minimum buffer level so as to allow the server to adjust the transmission rate and/or nominal playout rate based on the targeted minimum buffer level.

12. The method of claim 11, wherein the server is adapted to adjust the transmission rate and/or nominal playout rate based on the targeted minimum buffer level and the sequence number of the last packet in the sequence to be played out.

13. The method of claim 1, wherein the streaming server is adapted for providing the sequence of packets in a transmission rate to the streaming client for allowing the client to playout at least a portion of the packets at a playout rate, and wherein the receiver buffer is adapted for storing at least a portion of the packets in order to compensate for a difference between the transmission rate and the playout rate so as to allow the client to have a sufficient amount of the streaming data to playout in a non-disruptive manner.

14. An adaptive control system for use in a multimedia streaming system, the streaming system comprising at least a streaming client adapted for receiving a sequence of packets from a streaming server through a communication link, said control system comprising:
in the client:
a module configured to convey to the server through the communication link a message including information indicative of scheduled playout time of a selected one of the packets in the sequence to be played out, the selected one of the packets having a scheduled playout time, wherein the client comprises a receiver buffer for storing at least part of the sequence of packets; and
in the server:
a further module configured to compute a fullness level in the receiver buffer at least partly based on the information in the message so as to allow the server to adjust transmission characteristic in the server at least partly based on the fullness level wherein the fullness level is computed based on a sequence number of the selected packet, a time difference between the scheduled playout time of the selected packet and a current time, and the sequence number of a last packet in the sequence to be played out.

15. The system of claim 14, wherein said further module in the server is adapted to compute the fullness level in the receiver buffer based on a timestamp associated with the last packet in the sequence to be played out and the information.

16. The system of claim 14, wherein the the selected packet is a first packet to be played out.

17. The system of claim 14, wherein said module in the client is configured to send a receiver report along with the information indicative of the selected one of the packets in the sequence to be played out.

18. The adaptive control system of claim 14, wherein the streaming server is adapted for providing the sequence of packets in a transmission rate to the streaming client for allowing the client to playout at least a portion of the packets at a playout rate, and wherein the receiver buffer is adapted for storing at least a portion of the packets in order to compensate for a difference between the transmission rate and the playout rate so as to allow the client to have a sufficient amount of the streaming data to playout in a non-disruptive manner.

19. An apparatus comprising:
a receiver buffer configured to store at least a portion of a sequence of packets to be played out received from a server through a communication link; and
a module configured
to select one of the packets from stored portion of the sequence of packets in the receiver buffer at a time instant, the selected one of the packets in the sequence having a scheduled playout time; and
to convey to the server through the communication link a message including information indicative of scheduled playout time of the selected one of the packets, wherein the server is configured to compute a fullness level in the receiver buffer at least partly based on the information in the message, and wherein the fullness level is computed based on a sequence number of the selected packet, a time difference between the scheduled playout time of the selected packet and a current time, and the sequence number of a last packet in the sequence to be played out.

20. The apparatus of claim 19, wherein the information is indicative of an identity of a selected one of packets in the sequence to be played out and the time difference between a scheduled playout time of said selected packet and the current time.

21. The apparatus of claim 20, wherein said selected packet to be played out is a last packet in the sequence of packets to be played out.

22. The apparatus of claim 21, wherein the selected packet is a first packet to be played out.

23. The apparatus of claim 19, wherein the server is adapted for providing the sequence of packets in a transmission rate to the apparatus for allowing the apparatus to playout at least a portion of the packets at a playout rate, and wherein the receiver buffer is adapted for storing at least a portion of the packets in order to compensate for a difference between the transmission rate and the playout rate so as to allow the apparatus to have a sufficient amount of the streaming data to playout in a non-disruptive manner.

24. An adaptive control system for use in a multimedia streaming system, the streaming system comprising at least a streaming client adapted for receiving a sequence of packets from a streaming server through a communication link, said control system comprising:
means, in the client, for conveying to the server through the communication link a message including information indicative of scheduled playout time of a selected one of the sequence of packets to be played out, the selected one of the sequence of packets having a scheduled playout time, wherein the client comprises a receiver buffer for storing a least part of the sequence of packets; and
means, in the server, for computing a fullness level in the receiver buffer at least partly based on the information in the message so as to allow the server to adjust transmission characteristic in the server at least partly based on the fullness level, wherein the fullness level is computed based on a sequence number of the selected packet, a time difference between the scheduled playout time of the selected packet and a current time, and a sequence number of the last packet in the sequence to be played out.

25. The system of claim 24, wherein the computing means in the server is configured to compute the fullness level in the receiver buffer based on a timestamp associated with the last packet to be played out and the information.

26. The adaptive control system of claim 24, wherein the streaming server is adapted for providing the sequence of packets in a transmission rate to the streaming client for allowing the client to playout at least a portion of the packets at a playout rate, and wherein the receiver buffer is adapted for storing at least a portion of the packets in order to compensate for a difference between the transmission rate and the playout rate so as to allow the client to have a sufficient amount of the streaming data to playout in a non-disruptive manner.

\* \* \* \* \*